United States Patent
Dagum et al.

(10) Patent No.: US 7,249,049 B1
(45) Date of Patent: Jul. 24, 2007

(54) METHOD AND BUSINESS PROCESS FOR THE ESTIMATION OF MEAN PRODUCTION FOR ASSEMBLE-TO-ORDER MANUFACTURING OPERATIONS

(75) Inventors: Paul Dagum, San Francisco, CA (US); Michael Goldbach, Berkeley, CA (US); Balazs Kralik, Berkeley, CA (US)

(73) Assignee: Rapt, Inc., San Francisco, CA (US)

( * ) Notice: Subject to any disclaimer, the term of this patent is extended or adjusted under 35 U.S.C. 154(b) by 911 days.

(21) Appl. No.: 09/887,545

(22) Filed: Jun. 21, 2001

Related U.S. Application Data

(60) Provisional application No. 60/213,189, filed on Jun. 21, 2000.

(51) Int. Cl.
*G06F 17/30* (2006.01)

(52) U.S. Cl. .................................. 705/10
(58) Field of Classification Search ............... 705/10
See application file for complete search history.

(56) References Cited

U.S. PATENT DOCUMENTS

| | | | |
|---|---|---|---|
| 3,670,861 A | 6/1972 | Zenner et al. | |
| 3,782,278 A | 1/1974 | Barnett et al. | |
| 3,804,626 A | 4/1974 | Harvey | |
| 3,810,189 A | 5/1974 | Casperson et al. | |
| 3,874,492 A | 4/1975 | Hurst | |
| 3,941,051 A | 3/1976 | Barrus et al. | |
| 3,941,230 A | 3/1976 | Bellino et al. | |
| 3,942,619 A | 3/1976 | Nordstrom et al. | |
| 4,159,882 A | 7/1979 | Sanders, Jr. et al. | |
| 4,239,403 A | 12/1980 | Matula et al. | |
| 4,248,148 A | 2/1981 | Mahoney et al. | |
| 4,250,808 A | 2/1981 | Katsura et al. | |
| 4,289,069 A | 9/1981 | Melissa et al. | |
| 4,336,751 A | 6/1982 | Melissa et al. | |
| 4,340,848 A | 7/1982 | Hanagata et al. | |

(Continued)

FOREIGN PATENT DOCUMENTS

| | | |
|---|---|---|
| JP | 63-122562 | 5/1988 |
| JP | 4-301461 | 10/1992 |

OTHER PUBLICATIONS

Papageorgiou "Faster Evaluation of Multidimensional Integrals", Jun. 1997, Department of Computer Science.*

(Continued)

*Primary Examiner*—Romain Jeanty
(74) *Attorney, Agent, or Firm*—Campbell Stephenson LLP

(57) ABSTRACT

A method for forecasting the mean production (the expected production) for a target planning period is provided. To begin this method, a user, or planner chooses one or more products for which the expected production is desired. The user then enters data describing each selected product. The data entered for each product includes data describing the demand for that product as well as data describing the components required for each product. Inter-product dependencies are also entered. The expected production for each selected product for the target planning-period is expressed as a sum of multidimensional integrals involving the data entered in the previous two steps. Once formulated, the integrals are evaluated. The result of this computation is then presented to the user.

18 Claims, 5 Drawing Sheets

U.S. PATENT DOCUMENTS

| | | | |
|---|---|---|---|
| 4,351,235 A | 9/1982 | Bringhurst | |
| 4,359,289 A | 11/1982 | Barrus et al. | |
| 4,364,024 A | 12/1982 | Paetsch | |
| 4,387,642 A | 6/1983 | Bringhurst et al. | |
| 4,400,104 A | 8/1983 | McCray et al. | |
| 4,444,521 A | 4/1984 | Rickard et al. | |
| 4,462,702 A | 7/1984 | Fritz et al. | |
| 4,480,541 A | 11/1984 | Grummett | |
| 4,513,661 A | 4/1985 | Melissa et al. | |
| 4,543,002 A | 9/1985 | Bittner et al. | |
| 4,565,127 A | 1/1986 | Pichler et al. | |
| 4,588,316 A | 5/1986 | Everett, Jr. | |
| 4,601,241 A | 7/1986 | Fujiwara | |
| 4,625,638 A | 12/1986 | Fritz et al. | |
| 4,632,584 A | 12/1986 | Becchi et al. | |
| 4,688,956 A | 8/1987 | Miyake | |
| 4,693,618 A | 9/1987 | Hanagata | |
| 4,869,610 A | 9/1989 | Nishizawa et al. | |
| 4,897,589 A | 1/1990 | Fujiwara et al. | |
| 5,059,047 A | 10/1991 | Nakamura et al. | |
| 5,366,303 A | 11/1994 | Barrus et al. | |
| 5,666,880 A | 9/1997 | Barrus | |
| 6,061,662 A * | 5/2000 | Makivic | 705/36 R |
| 6,151,582 A * | 11/2000 | Huang et al. | 705/8 |
| 6,516,313 B1 | 2/2003 | Perry | 707/6 |
| 6,684,193 B1 | 1/2004 | Chavez et al. | 705/8 |

OTHER PUBLICATIONS

Michaela et al (A likelihood Approach to Estimating Market Equilibrium Models); pp. 1-31.*

Gupta et al "Busisness Strategy, Manufacturing Flexibility, and Organizational Performance Relationships: A path Analysis Approach"; Dec. 1996, Production and Operation Management, pp. 204-233.*

Bass, Frank M., Purdue University, *A New Product Growth For Model Consumer Durables*, Management Science, vol. 15, No. 5, Jan. 1969, pp. 216-227.

Dagum, Camilo, Econometric Research Program Princeton University, *Structural Permanence: Its Role in the Analysis of Structural Dualisms and Dependences and for Prediction and Decision Purposes*, The Economics of Structural Change vol. 1, The International Library of Critical Writings in Economics, An Elgar Reference Collection, 1969, pp. 211-235.

Mahajan, Vijay, Muller, Eitan and Bass, Frank M., *New-Product Diffusion Models,* Chapter 8, Handbooks in OR & MS, vol. 5, J. Eliashberg and G.L. Lilien, Eds., 1993, pp. 349-408.

Hanssens, Dominique M. and Leonard, J. Parsons, *Econometric and Time-Series Market Response Models*, Chapter 9, Handbooks in OR & MS, vol. 5, J. Eliashberg and G.L. Lilien, Eds., 1993, pp. 409-464.

* cited by examiner

US 7,249,049 B1

METHOD AND BUSINESS PROCESS FOR THE ESTIMATION OF MEAN PRODUCTION FOR ASSEMBLE-TO-ORDER MANUFACTURING OPERATIONS

RELATED APPLICATIONS

This application is a continuation of U.S. Provisional Application Ser. No. 60/213,189 filed Jun. 21, 2000. That disclosure is incorporated in this document by reference.

TECHNICAL FIELD OF THE INVENTION

The present invention is generally related to resource-planning methods used by manufacturing companies and other organizations. More specifically, the present invention includes a strategic resource planning method that accounts for uncertainties inherent in the forecasting process.

BACKGROUND OF THE INVENTION

In the field of product manufacturing, the term assemble-to-order (ATO) refers to systems where products are not produced until the demand for the products becomes known.

Manufacture-to-stock (MTS) systems, on the other hand, base production on component availability. Unlike ATO manufacturing, MTS systems often produce products before the demand for those products has been determined.

Manufacturing companies typically prefer to use ATO manufacturing operations whenever possible. ATO allows manufacturers to minimize their component inventories. This reduces the amount of capital invested in components and reduces the risk that components will loose value or become obsolete before they are transformed and sold as products.

In ATO manufacturing operations, it is paramount for decision-makers to be able to accurately forecast production on a period-by-period basis. The absence of accurate forecasting means that makes the estimation of important quantities such as expected revenues and costs difficult and in some cases impossible.

Unfortunately, accurately forecasting production can be problematic. Product demand is necessarily an important factor in estimations of this type. At the same time, product demand is not, by itself, a sufficient basis for forecasting. This follows because production can (and often is) constrained by the availability of the components needed to assemble the products. As a result, there is always a chance that the demand for a product will not be met within a particular period. Typically, this means that customers are either turned away or that orders are delayed—the product is "back ordered."

To accurately forecast production, manufactures must be able to compute expected production from stochastic demand data, component consumption data and component levels. In many cases, this computation will involve a plurality of product and component kinds, potentially numbering in the thousands or more. FIG. 1 describes this problem for a simplified case where there are two products P1 and P2 and two components C1 and C2.

In FIG. 1, the production constraints imposed by the components C1 and C2 are shown as two dashed lines labeled C1 and C2. These lines divide the space of possible production values for the pair (P1, P2) into feasible and infeasible regions. The feasible region is the portion of the positive quadrant under the lines C1 and C2.

The probability distribution of demand is illustrated by the concentric ellipses. Each ellipse is an iso-probability curve (i.e. the line connects (P1, P2) points of equal probability). It is clear that there is a nonzero chance that the demand for the product pair may fall in the infeasible region.

If demand falls in the infeasible region, actual production will be less than demand. Hence mean production will be less than mean demand. There is a need for systems that can accurately calculate the differences between mean demand and mean production. This is particularly true for manufacturing operations that involve large numbers of products or large numbers of components. It is also particularly true where the markets for products or the market for components are volatile.

SUMMARY OF THE INVENTION

An embodiment of the present invention includes a method for forecasting the mean production (the expected production) for a target planning period. To begin this method, a user, or planner chooses one or more products for which the expected production is desired.

The user then enters data describing each selected product. The data entered for each product includes data describing the demand for that product as well as data describing the components required for each product. Inter-product dependencies are also entered.

The expected production for each selected product for the target planning-period is expressed as a sum of multidimensional integrals involving the data entered in the previous two steps. Once formulated, the integrals are evaluated. The result of this computation is then presented to the user.

Stated differently, the present invention includes a method for the estimation of mean production for assemble-to-order manufacturing operations, the method comprising the steps of: specifying a product to be analyzed; entering data describing the components required to produce the specified product; formulating a sum of multidimensional integrals corresponding to the estimation of mean production for the specified product; and evaluating the sum of multidimensional integrals.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments of the present invention and their advantages are best understood by referring to FIGS. 1 through 4 of the drawings. Like numerals are used for like and corresponding parts of the various drawings.

Definitions

Component plan: a list of quantities for each component, representing a company's component order for a given planning period.

Scenario: a set of assumptions about products and components. A scenario includes product parameters, component parameters, component consumption, component interactions, and an allocation policy.

Environment

Figure 1:
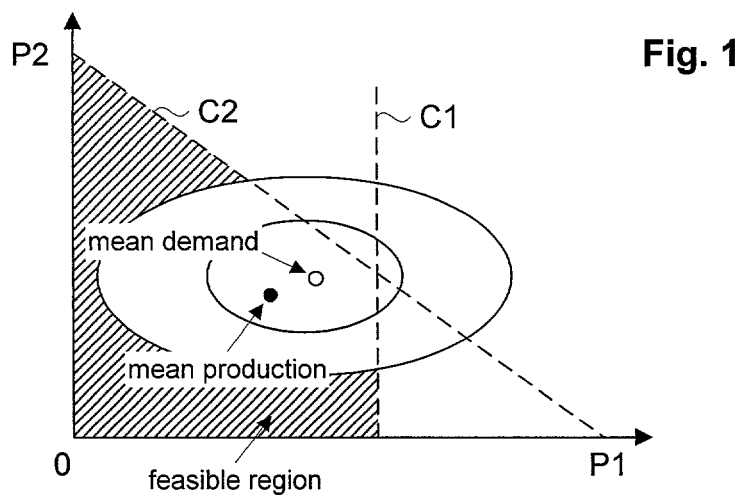
FIG. 1 is a graph showing production as it relates to demand in both feasible and infeasible regions.
Figure 2:
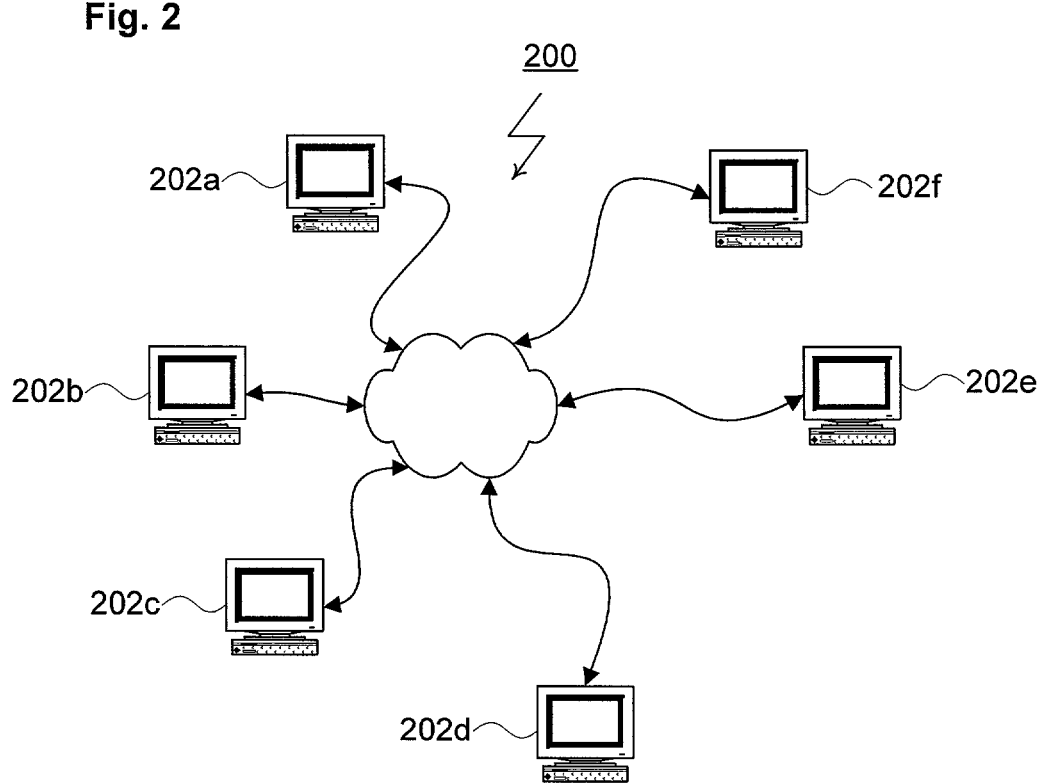
FIG. 2 is a block diagram of an Internet-like network shown as a representative environment for deployment of the present invention.

In FIG. 2, a computer network 200 is shown as a representative environment for an embodiment of the present invention. Computer network 200 is intended to be representative of the complete spectrum of computer network types including Internet and Internet-like networks. Computer network 200 includes a number of computer systems, of which computer system 202a through 202f are representative. Computer systems 202 are intended to be representative of the wide range of large and small computer and computer-like devices that are used in computer networks of all types. Computer systems 202 are specifically intended to include non-traditional computing devices such as personal digital assistants and web-enabled cellular telephones.

Figure 3:
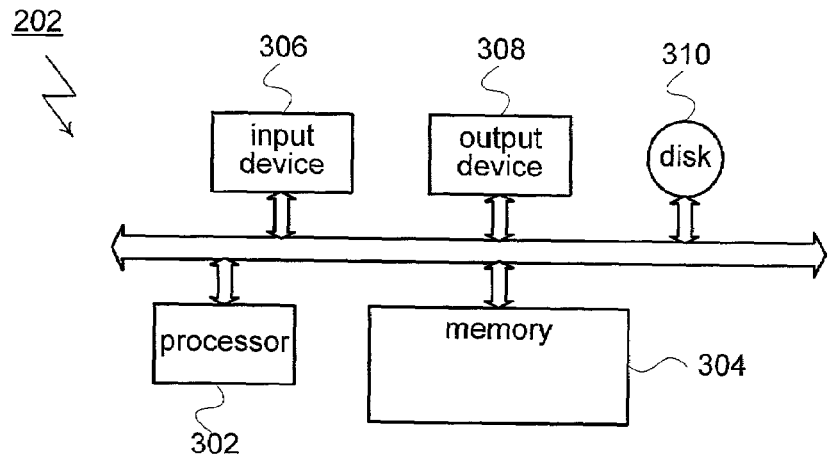
FIG. 3 is a block diagram of a computer system as used within the network of FIG. 1.

FIG. 3 shows a representative implementation for computer systems 202. Structurally, each computer system 202 includes a processor, or processors 300, and a memory 302. Processor 300 can be selected from a wide range of commercially available or custom types. An input device 304 and an output device 306 are connected to processor 300 and memory 302. Input device 304 and output device 306 represent all types of I/O devices such as disk drives, keyboards, modems, network adapters, printers and displays. Each computer system 202 may also includes a disk drive 310 of any suitable disk drive type (equivalently, disk drive 310 may be any non-volatile mass storage system such as "flash" memory).

Overview of Method and Apparatus for Resource Plan Analysis Under Uncertainty

Figure 4:
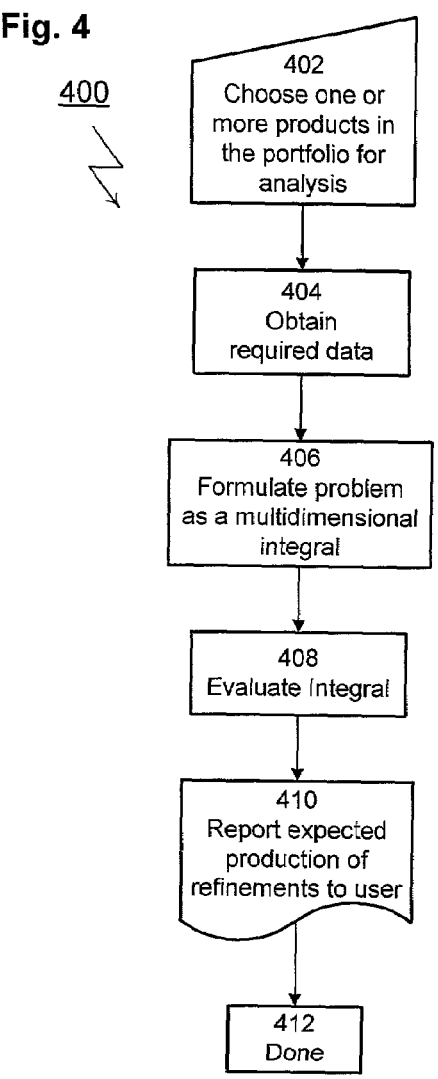
FIG. 4 is a flowchart showing the steps associated with an embodiment of the mean production forecasting method of the present invention.

As shown in FIG. 4, an embodiment of the present invention includes a Method 400 for forecasting the mean production (the expected production) for a target planning period. Method 400 begins with step 402 where a user, or planner, chooses one or more products for which the expected production is desired.

In step 404 the user enters data describing each product selected in step 402. The data entered for each product includes data describing the demand for that product as well as data describing the components required for each product. Inter-product dependencies are also entered.

In step 406 the expected production for the target planning-period is expressed as a sum of multidimensional integrals involving the data entered in the previous two steps.

In step 408 the sum of integrals formulated in the previous step is evaluated. This evaluation may be performed using a range of different methods including Monte Carlo simulation and quadratures. It is preferable, however to use the method disclosed in the copending commonly owned application "Method And Apparatus For Multivariate Allocation Of Resources." This method is particularly preferable in cases when Method 400 is being performed for large numbers of products or components. In these cases, other evaluation methods may be too slow or unstable.

In step 410 the result of the computation of step 408 is presented to the user.

Product Selection

In step 402, the user identifies the m products that will be analyzed.

Product and Component Data Specification

Figure 5:
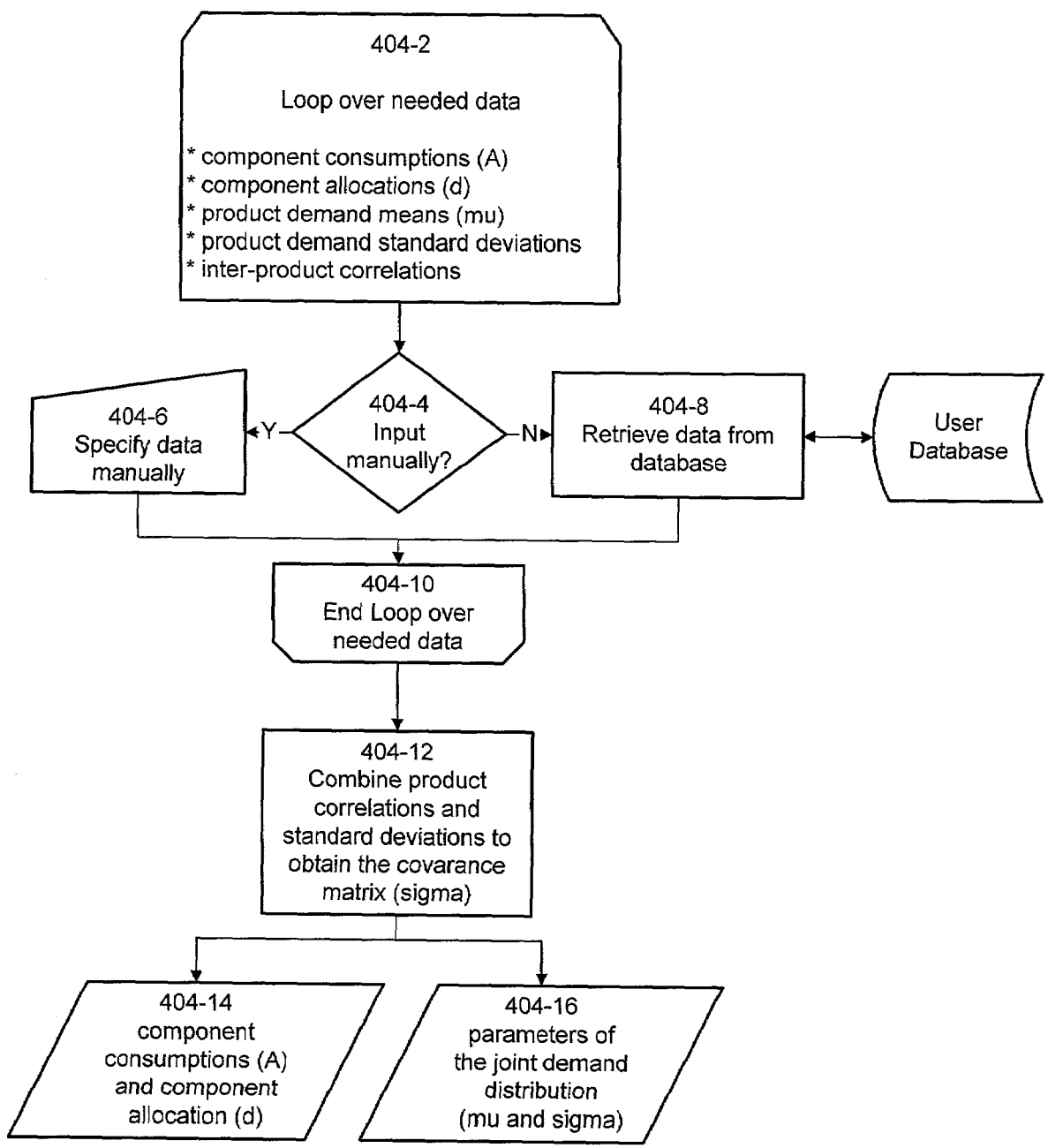
FIG. 5 is a flowchart showing the sub-steps associated with the step of entering data about products and components as used within the method of FIG. 4.

Step 404, where the user specifies the required data for the mean production calculation, can be further subdivided into the sequence of steps shown in FIG. 5. The initial portion of this sequence is a loop that includes steps 404-2 through 404-10. In this loop, data is input for each of the m products that have been selected for processing by Method 400. Data is also input for each of the n components that are required (either directly or indirectly) to produce the products that have been selected for processing by Method 400

In the loop of steps 404-2 through 404-10 the following information is entered:

1) The type of components required to produce each product,
1) The number of each component required to produce each product (A),
1) The allocation of each component (d),
1) The mean demand for each product ($\mu$),
1) The standard deviation of the demand for each product,
1) The correlation between each product and any other product.

Within this loop, each data item can be input manually by the user (see step 402-6) or retrieved from a user database (see step 402-8).

In the loop of steps 404-2 through 404-10, an m×n matrix A is created. The matrix A includes one column $a_i$ for each of the m products selected for analysis. Each column $a_i$ contains the bill of materials required to produce one product. Each of the n elements of a given $a_i$ specifies the quantity of a particular component required to produce the corresponding product.

The loop of steps 404-2 through 404-10 also generates a vector d. The vector d includes a total of n elements, one for each component. Each element within d specifies the available quantity of a corresponding component.

The loop of steps 404-2 through 404-10 also generates a vector d. The vector d includes a total of n elements, one for each component. Each element within d specifies the available quantity of a corresponding component.

The loop of steps 404-2 through 404-10 also generates a vector $\mu$. The vector $\mu$ includes total of m elements, one for each product. Each element within $\mu$ specifies the mean demand for a corresponding product.

Once the data required for each product and component has been input, processing continues at step 404-12. In step 404-12, the product correlations (item 6 above) and demand standard deviations (item 4 above) input in the preceding loop are combined to create a covariance matrix $\Sigma$.

Formulation of Expected Production as a Sum of Multidimensional Integrals

Figure 6:
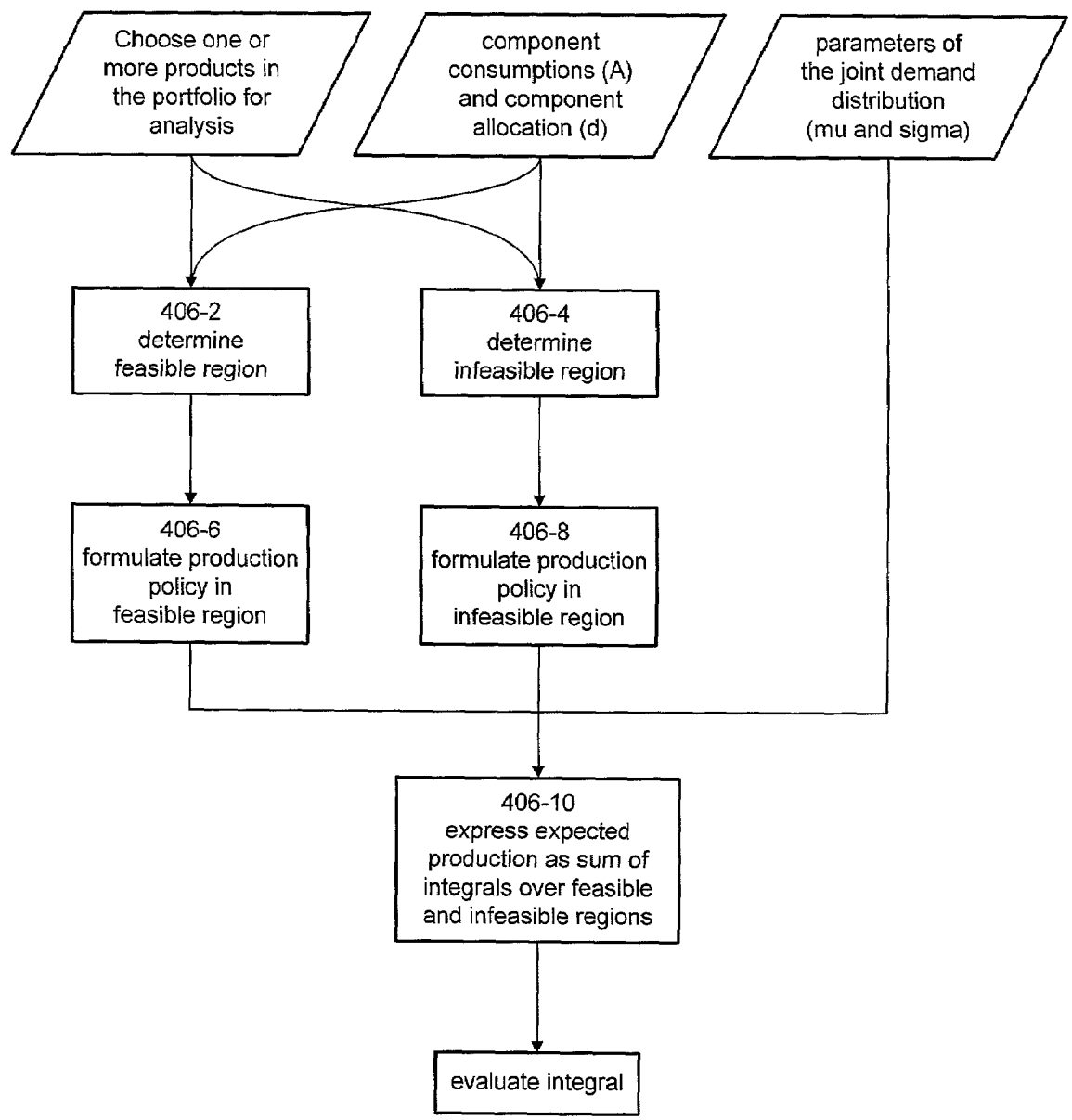
FIG. 6 is a flowchart showing the sub-steps associated with the step of generating a sum of integrals as used within the method of FIG. 4.
Figure 7:
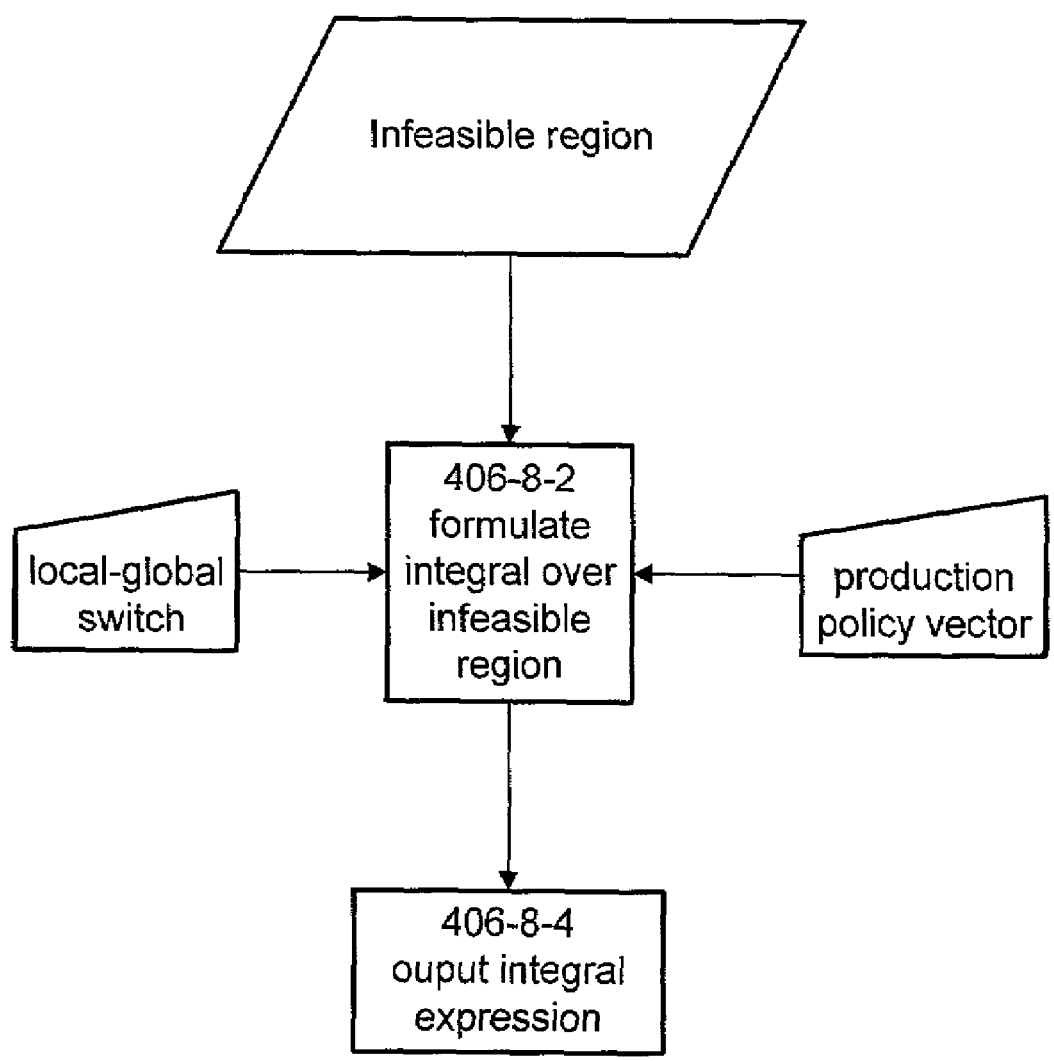
FIG. 7 is a flowchart showing the sub-steps associated with the step of selecting a production policy as used within the method of FIG. 4.

In Step 406, the covariance matrix is used to formulate a sum of multidimensional integrals. This step (i.e., creation of the multidimensional integrals) can be further subdivided into the sequence of steps shown in FIG. 6.

In step 406-2, a feasible region (denoted $\Omega$) is defined. The feasible region $\Omega$ is defined to include all points where the demand for a product can be met with the current levels of the components needed to manufacture the product. To determine $\Omega$, the matrix A and vector d generated in step 404 are used. $\Omega$ is defined as the space of those q vectors, for which the inequality d−Aq>0 holds, where q is a vector variable denoting the production of the products.

In step 406-4 a production policy is specified for the feasible region $\Omega$. The production policy for a region is a function that relates production to demand. Within $\Omega$, component availability d equals or exceeds demand. As a result, production is equivalent to demand within the feasible region $\Omega$. For this reason, the production policy for $\Omega$ is set to q(x)=x reflecting the fact that production is capable of mirroring demand within $\Omega$.

In step 406-6, an infeasible region (denoted $\overline{\Omega}$) is determined. The infeasible region $\overline{\Omega}$ is the space of all vectors, where the demand for a product exceeds the supply of components needed to manufacture the product. $\overline{\Omega}$ includes all vectors, or equivalently points, which are not included in $\Omega$. $\overline{\Omega}$ is defined as the complement of $\Omega$ as determined in step 406-2. In general, $\Omega$ and $\overline{\Omega}$ are separated by a hyperplane in the n dimensional space $\mathfrak{R}$.

In step 406-8 a production policy for the infeasible region $\overline{\Omega}$ is formulated. Unlike production in the feasible region $\Omega$, production within the infeasible region $\overline{\Omega}$ does not mirror demand. This is because component demand exceeds component supply within $\overline{\Omega}$. In step 406-8 a production policy is specified to determine how production will proceed in light of component supply inadequacies. The production policy is a function q(x) that maps demand to production in $\overline{\Omega}$.

A range of different production policies may be used in step 406-8. For the particular implementation being described, a production policy known as the uniform production policy is used. The uniform production policy relates production q to demand x within the infeasible region $\overline{\Omega}$ using the function: $q(x)=x-\alpha(x)u$. In this function, u is a production policy vector that the user may optionally specify. The production policy vector u shows the amounts by which demand for products has to be decreased until the demand is feasible. $\alpha(x)$ is defined as:

$$\alpha(x) = \max_{i \in [m]} \left[ \frac{a_i \cdot x - d_i}{a_i \cdot u} \right]$$

This formulation of $\alpha(x)$ ensures that, for any $x \in \overline{\Omega}$ and a given u, the production policy $\alpha(x)$ is the highest level such that q(x)<x and d−Aq>0. The values of the elements of the constraint matrix A can be calculated from the components of the policy vector u and $\alpha(x)$.

In step 406-10 the expected or mean production $\overline{q}$ is expressed as the following sum of multidimensional integrals:

$$\overline{q} = \int_\Omega x f(x, \mu, \Sigma) dx + \int_{\overline{\Omega}} q(x) f(x, \mu, \Sigma) dx$$

where $f(x, \mu, \Sigma)$ is the multivariate normal density function with mean $\mu$ and covariance matrix $\Sigma$.

Evaluation of Multidimensional Integrals

In step 408 the sum of the integrals, which were formulated in the previous step, is evaluated to compute the expected or mean production $\overline{q}$. To compute $\overline{q}$, $\alpha(x)$ is rewritten using the Cholesky decomposition of $\Sigma$. As previously noted, $\Sigma$ is the covariance matrix originally computed using the product demand standard distributions and inter-product correlations (see step 404-12). The Cholesky decomposition of the covariance matrix $\Sigma$ can be written as $TT'=\Sigma$, where T is a lower triangular matrix. A benefit of the Cholesky decomposition is that the transformed random variables z have zero mean and $I_n$, the identity matrix as their covariance matrix. With this transformation of variables x may be rewritten as $x=Tz+\mu$, and the feasible region $\Omega$ also gets transformed into $\Omega'$.

The Case of Single Component Constraints

In this section we demonstrate the essentials of the technique by first describing the case, when there is a constraint only for a single component. In this case the feasible region $\Omega$ is defined by the constraint equation $d-a\cdot\mu-b\cdot z=0$, where $b=T'a$, and d is a scalar number, describing the single constraint.

After the Cholesky transformation the next step is to perform an orthogonal rotation R, which transforms the vector b to point along a unit vector of the new system, say $e_1$: $Rb=|b|e_1$, where $|b|$ is the magnitude of vector b. After the rotation the new variables will be denoted by w: w=Rz. Because of the orthonormality of R the covariance matrix of w will still be the identity matrix. An advantage of this rotation is that the hyperplane, defining the feasible region $\Omega$ is now perpendicular to only one axis, defined by $e_1$, and it is parallel to all the other axis of the rotated coordinate system. Therefore the n dimensional integral, confined by a generic hyperplane, is transformed into an integral, which is confined along a single axis, and is unconfined in the other n−1 directions. The unconfined integrals are straightforward to execute and we are left with a singlevariate integral, which is much easier to perform. In mathematical form the integral of some function h(x) over the feasible region can be written as:

$$I = \int_{\mathfrak{R}^{n-1}} f(w_{n-1}; 0, I_{n-1}) dw_{n-1} \int_{-\infty}^{U} h''(w) f(w_1; 0, 1) dw_1$$

Here h" (w) is the generic function h(x) after the Cholesky transformation T and the rotation R, $w_{n-1}=(w_2, \ldots, w_n)$, and $\mathfrak{R}$ is the (n−1) dimensional space of real numbers. Finally $U=(d-a\mu)/|b|$, identifying the intersection of the hyperplane and the $e_1$ axis.

In the special case of h(x)=d−ux, the twice transformed function takes the form:

$$h''(w)=d-u\cdot\mu-RT'u\cdot w$$

With this the integral I can be rewritten as $$I=(d-u\mu)\mathfrak{I}[-\infty,U]-s_1\mathfrak{I}_x[-\infty,U].$$

Here $$\mathfrak{I}[-\infty, U] = \int_{\mathfrak{R}^{n-1}} f(w_{n-1}; 0, I_{n-1}) dw_{n-1} \int_{-\infty}^{U} f(w_1; 0, 1) dw_1,$$

and $$\Im_x[-\infty, U] = \int_{\Re^{n-1}} f(w_{n-1}; 0, I_{n-1}) dw_{n-1} \int_{-\infty}^{U} w_1 f(w_1; 0, 1) dw_1,$$

finally $$s_1 = \sum_{i=1}^{n} \sum_{j=1}^{n} R_{1i} T'_{ij} u_j$$

To summarize: as a result of the Cholesky transformation and the rotation R, the original I multivariate integral over a confined subspace has been reduced to a univariate definite integral, which can be executed often analytically, and always numerically.

The Case of Multicomponent Constraints

We now consider the case of having several constraints for the availability of components. These constraints can be written as a set of constraint equations $$d - Aq > 0$$

where d is a p dimensional vector, and A is a p times n dimensional matrix. Here p is less than or equal to n. The i-th row of the matrix A corresponds to the constraint vector $a_i$ similarly to the case of the single component constraint. The first step of the method, the Cholesky transformation, can be performed in the present case as well, transforming to the new variables z. The constraint vectors $a_i$ are transformed into the vectors $b_i$ by this transformation.

These equations once again define the feasible region, which is now bounded by a set of hyperplanes. However in a generic case the hyperplanes are not orthogonal to each other. For this reason in general it is hard to separate the multivariate integrals into univariate integrals.

An approximate evaluation of the integral I can be constructed the following way. Define a new r-dimensional orthogonal basis u defined by a set of r hyperplanes, such that each of the original m hyperplanes is mapped to a new hyperplane. In general r is less than or equal to m and in practice r is often 1. The index mapping from the original m-dimensional basis to the new r-dimensional set is represented by σ such that σ(i) is the index of new hyperplane associated with the original hyperplane i. The new basis may be defined in various ways with the objective being to closely approximate the originalfeasible region. In practice we take the new basis to be a single orthanormally transformed hyperplane.

In general the dimension of the space of these new u orthogonal constraint vectors can be smaller than those of the original b constraint vectors. Therefore some of the transformed hyperplanes, which are now orthogonal to only one axis, will be parallel to each other. In this case the integration along the say j-th axis should go up to $c_j$, the minimum of the integrational limits along these axis. In terms of the original variables:

$$c_j = \min_{i \in \sigma^{-1}(j)} \left[ \frac{d_i - a_i \mu}{|b_i|} \right]$$

With this finally the integral I is given as:

$$I = \int_{\Re^{n-r}} f(w_{n-r}; 0, I_{n-r}) dw_{n-r} \prod_{j=1}^{r} \int_{-\infty}^{c_j} h''(w) f(w_j; 0, 1) dw_j$$

where r<m.

Now we will employ the above derived relations for the case, when we have to integrate a linear function of the variable $h(x) = d_i - a_i x$. The twice-transformed function takes the form:

$$h'(w) = d_i - a_i \mu - RT' a_i \cdot w.$$

Introducing $s = RT' a_i$

With this the integral I can be rewritten as $$I = (d_i - a_i \cdot \mu) \prod_{i=1}^{r} \Im[-\infty, c_i] - \sum_{j=1}^{r} s_j \Im_x[-\infty, c_j] \prod_{i=1, i \neq j}^{r} \Im[-\infty, c_i].$$

$$s_j = \sum_{i=1}^{n} \sum_{j=1}^{n} R_{ji} T'_{ik} (a_i) k.$$

With all these preparations, we are now ready to evaluate the integral of the production policy.

We start with performing the same Cholesky decomposition, which allows α(x) to be reduced as:

$$\alpha'(z) = \alpha(Tz + \mu) = \max_{i \in [m]} \left[ \frac{b_i \cdot z + a_i \cdot \mu - d_i}{a_i \cdot u} \right]$$

where again $b_i = T' a_i + \mu$.

Next the same orthornormal rotation is performed as before, using the matrix R. Then the m vectors $b_i$ are again approximated by r orthonormal vectors $u_j$ such that $b_i \cong |b_i| u_{\sigma(i)}$. This approximation identifies mutually orthogonal hyperplanes, which will allow for a more straightforward evaluation of the integral I. As before, σ is a mapping from the index set [m] into [r]. Substituting for the b and defining the rotation matrix R such that $Ru_{\sigma(i)} = e_{\sigma(i)}$ where $e_i$ are unit vectors yields:

$$\alpha''(w) = \alpha(R'w) = \max_{i \in [m]} [\beta_i w_{\sigma(i)} + \gamma_i].$$

Noting that $|b_i| = \sqrt{a_i' \Sigma a_i}$ $$\beta_i = \frac{\sqrt{a_i' \Sigma a_i}}{a_i \cdot u} \text{ and } \gamma_i = \frac{a_i \cdot \mu - d_i}{a_i \cdot u}$$

allows α''(w) to be rewritten as:

$$a''(w) = \max_{i \in [r]} \left[ \max_{j \in \sigma^{-1}(i)} (\beta_j w_i + \gamma_j) \right].$$

We are now ready to compute the value of the expected production. An important part of the calculation is to evaluate the following integral $$I^* = \int_\Omega \alpha(x) f\left(x, \mu, \sum\right) dx.$$

Using the above preparatory formulae I* reduces to $$I^* = \prod_{i=1}^r \int_{-\infty}^{c_l} \alpha''(w) f(w, 0, I_n) dw$$

where we used that the fact that the f multivariate normal density function is normalized to one, thus in the directions where the integration is unconstrained, the integrals can be readily performed to yield unity. Hence only those integrals remain, where a hyperplane introduces a $c_i$ upper bound for the integral:

$$c_i = \min_{j \in \sigma^{-1}(i)} \left[\frac{d_j - a_j - \mu}{|b_j|}\right].$$

Since $\alpha''(w)$ is a linear function of its argument, once again the preparatory formulae can be applied to yield $$I^* = \sum_{i=1}^r \int_{-\infty}^{c_l} \max_{j \in \sigma^{-1}(i)} (\beta_j w_i + \gamma_j) \prod_{k \neq i} \Im \left[-\infty, \min(c_k, U_{ik}(x))\right] f(x, 0, 1) dx$$

Using the notation $$M_i = \max_{j \in \sigma^{-1}(i)} (\beta_j w_i + \gamma_j)$$

the following describes the integrational limit $U_{ik}$:

$$U_{ik} = \min_{j \in \sigma^{-1}(i)} \left[\frac{M_i - \gamma_j}{\beta_j}\right]$$

In the final analysis the original n dimensional multivariate integral with an arbitrary covariance matrix, constrained by a set of p arbitrary hyperplanes, has been reduced to r independent univariate definite integrals. Note that when r=1, $\sigma^{-1}(i)$ is the entire set [m].

As can be shown, the original integral is an NP hard problem, requiring exponentially long time for evaluation, whereas the just-derived univariate integrals can be evaluated in a straightforward manner by any known numerical technique, including even the Simpson procedure.

The total expected production is then given by $$\bar{q} = \int_\Omega x f\left(x, \mu, \sum\right) dx + \int_{\bar\Omega} q(x) f\left(x, \mu, \sum\right) dx$$

$$\bar{q} = \int_{\Omega + \bar\Omega} x f\left(x, \mu, \sum\right) dx - u \int_{\bar\Omega} \alpha(x) f\left(x, \mu, \sum\right) dx$$

$$\bar{q} = \int_{\Omega + \bar\Omega} x f\left(x, \mu, \sum\right) dx - u \int_{\Omega + \bar\Omega} \alpha(x) f\left(x, \mu, \sum\right) dx + u \int_\Omega \alpha(x) f\left(x, \mu, \sum\right) dx$$

Here one recognizes that the integration over the $\Omega + \bar\Omega$ space is an integration over the total space, not constrained by the hyperplanes, and as such, can be readily calculated. Finally the last term is exactly what has been calculated above, thus the above result for I* can be directly employed here, yielding the desired expected production.

The Local U-Policy

The uniform policy prescribes a demand-production mapping that is manifestly irrational in some cases. In particular, the problem of "intercomponent" effects arises where a component that gates production for one product will diminish production over all. This arises because the previous policies compute a single α for all products.

On an event by event bases, an "iterated policy" represents rational demand-production mappings, but analytic formulas are not available for the expected production over these policies. A compromise is to compute a separate α for each product. This we refer to as the local u-Policy.

As before, for product i, let D(i) denote the components in the BOM of i. Also, as before, for any component j we can define the subspaces $\Omega = \{x : d_j - a_j \cdot x > 0\}$. We now define the subspaces $\Omega^i$ for each product i as $$\Omega_i \cap_{j \in D(i)} \Omega_j$$

If $x \in \Omega_i$ then component allocation is sufficient to meet product demand for the $i^{th}$ product, even though it may not be sufficient to meet demand for other products.

We make the important observation that in computing expected values for functions h(x) that can be separated into a sum, $$h(x) = h_1(x_1) + \ldots + h_n(x_n)$$

the appropriate subspace of integration for the feasible production for each function $h_j$ is $\Omega^j$.

For any subspace $\Omega$, let $E_\Omega$ denote the expectation over support $\Omega$. Thus, the expectation of h can be expressed as $$Eh = \sum_{i=1}^n |E_{\Omega^i} h_i(x_i) + E_{\bar\Omega^i} h_i(q(x))|$$

where q(x) is any production policy that maps each $x \in \bar\Omega^i$ into $q_i(x) \in \Omega^i$.

We define the local u-policy q as $$q_i(x) = \begin{cases} x_i & \text{if } x \in \Omega_i \\ x_i - \alpha_i(x, d) u_i & \text{otherwise} \end{cases}$$

where $$\alpha_i(x, d) = \max_{j \in D(i)} \left[ \frac{a_j \cdot x - d_j}{a_j \cdot u} \right]$$

We now show that with the preceding definition, for any k, we have that $d_k - a_k \cdot q > 0$. Substituting q we get $$d_k - a_k \cdot q = d_k - a_k \cdot x + \sum_{i=1}^{n} a_{ki} u_i \max_{j \in D(i)} \left[ \frac{a_j \cdot x - d_j}{a_j \cdot u} \right]$$

But observe that $\alpha_{k1} = 0$ if $k \notin D(i)$, and therefore $$\max_{j \in D(i)} \left[ \frac{a_j \cdot x - d_j}{a_j \cdot u} \right] \geq \frac{a_k \cdot x - d_k}{a_k \cdot u}$$

proving that $d_k - a_k \cdot q > 0$.

Computation of the results in this case is identical to the method described in the previous section except that a separate integration is done for each element of the expected production vector. For each element i, the index set of constraints [m] is replaced by the reduced set D(i) which includes only those components in the BOM for product i. (i.e., the index of rows in the i-th column of the connect matrix A for which the entry is nonzero).

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A computer-implemented method for the estimation of mean production for assemble-to-order manufacturing operations, the method comprising the steps of:
   receiving an identification of one or more products to be analyzed;
   receiving data describing components required to produce the products;
   determining a feasible region, the feasible region comprising conditions where a supply of the components meets a demand for the products;
   determining an infeasible region, the infeasible region comprising conditions where a supply of the components fails to meet a demand for the products;
   formulating a sum of multidimensional integrals corresponding to the estimation of mean production for the products; and
   evaluating the sum of the multidimensional integrals, wherein the sum of the multidimensional integrals is used for the estimation of mean production for the products.

2. A method as recited in claim 1 that further comprises the steps of:
   determining a feasible region $\Omega$ and an infeasible region $\overline{\Omega}$, the feasible including all points where the demand for the specified products can be met with the current levels of the components required to produce the specified product, the infeasible region including all points where the demand for the specified products cannot be met with the current levels of the components required to produce the specified product; and
   presenting the result of the evaluating step to a user.

3. A method as recited in claim 2 that further comprises the step of formulating respective production policies q(x) for the feasible region and the infeasible region.

4. A method as recited in claim 3 wherein the production policy for the feasible region is q(x)=x and the production policy for the infeasible region is the uniform production policy.

5. A method as recited in claim 3 wherein the production policy for the feasible region is q(x)=x and the production policy for the infeasible region is the local u-production policy.

6. A method as recited in claim 1, wherein the multidimensional integrals comprise a multidimensional integral over the feasible region and a multidimensional integral over the infeasible region.

7. A data storage medium having machine-readable code stored thereon, the machine-readable code comprising instructions executable by an array of logic elements, the instructions defining a method comprising the steps of:
   receiving an identification of one or more products to be analyzed;
   receiving data describing components required to produce the products;
   determining a feasible region, the feasible region comprising conditions where a supply of the components meets a demand for the products;
   determining an infeasible region, the infeasible region comprising conditions where a supply of the components fails to meet a demand for the products;
   formulating a sum of multidimensional integrals corresponding to an estimation of mean production for the products; and
   evaluating the sum of the multidimensional integrals, wherein the sum of the multidimensional integrals is used for the estimation of mean production for the products.

8. A data storage medium as recited in claim 7 wherein the method further comprises the steps of:
   determining a feasible region $\Omega$ and an infeasible region $\overline{\Omega}$, the feasible including all points where the demand for the specified products can be met with the current levels of the components required to produce the specified product, the infeasible region including all points where the demand for the specified products cannot be met with the current levels of the components required to produce the specified product; and
   presenting the result of the evaluating step to a user.

9. A data storage medium as recited in claim 8 wherein the method further comprises the step of formulating respective production policies q(x) for the feasible region and the infeasible region.

10. A data storage medium as recited in claim 9 wherein the production policy for the feasible region is q(x)=x and the production policy for the infeasible region is the uniform production policy.

11. A data storage medium as recited in claim 9 wherein the production policy for the feasible region is q(x)=x and the production policy for the infeasible region is the local u-production policy.

12. A data storage medium as recited in claim 7 wherein the multidimensional integrals comprise a multidimensional integral over the feasible region and a multidimensional integral over the infeasible region.

13. A system for the estimation of mean production for assemble-to-order manufacturing operations, the system comprising:
  means for receiving an identification of one or more products to be analyzed;
  means for receiving data describing components required to produce the products;
  means for determining a feasible region, the feasible region comprising conditions where a supply of the components meets a demand for the products;
  means for determining an infeasible region, the infeasible region comprising conditions where a supply of the components fails to meet a demand for the products;
  means for formulating a sum of multidimensional integrals corresponding to the estimation of mean production for the products; and
  means for evaluating the sum of the multidimensional integrals, wherein the sum of the multidimensional integrals is used for the estimation of mean production for the products.

14. A system as recited in claim 13 that further comprises:
  means for determining a feasible region $\Omega$ and an infeasible region $\overline{\Omega}$, the feasible including all points where the demand for the specified products can be met with the current levels of the components required to produce the specified product, the infeasible region including all points where the demand for the specified products cannot be met with the current levels of the components required to produce the specified product; and
  means for presenting the result of the evaluating step to a user.

15. A system as recited in claim 14 that further comprises means for formulating respective production policies $q(x)$ for the feasible region and the infeasible region.

16. A system as recited in claim 14 wherein the production policy for the feasible region is $q(x)=x$ and the production policy for the infeasible region is the uniform production policy.

17. A system as recited in claim 14 wherein the production policy for the feasible region is $q(x)=x$ and the production policy for the infeasible region is the local u-production policy.

18. A system as recited in claim 13, wherein the multidimensional integrals comprise a multidimensional integral over the feasible region and a multidimensional integral over the infeasible region.

* * * * *